US012730345B2

(12) United States Patent
Lian et al.

(10) Patent No.: US 12,730,345 B2
(45) Date of Patent: Sep. 8, 2026

(54) ELECTRONIC DEVICE

(71) Applicant: AUO Corporation, Hsin-Chu (TW)

(72) Inventors: Shiang-Lin Lian, Hsin-Chu (TW); Ya-Ling Hsu, Hsin-Chu (TW); Yueh-Hung Chung, Hsin-Chu (TW); Kun-Cheng Tien, Hsin-Chu (TW); Chun-Lung Huang, Hsin-Chu (TW); Liang-Yin Huang, Hsin-Chu (TW); Chin-An Lin, Hsin-Chu (TW); Jen-Hao Shih, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 264 days.

(21) Appl. No.: 18/399,068

(22) Filed: Dec. 28, 2023

(65) Prior Publication Data

US 2025/0110376 A1 Apr. 3, 2025

(30) Foreign Application Priority Data

Sep. 28, 2023 (TW) ................................ 112137547

(51) Int. Cl.
*G02F 1/155* (2006.01)

(52) U.S. Cl.
CPC .................................... *G02F 1/155* (2013.01)

(58) Field of Classification Search
CPC ...................................................... G02F 1/155
See application file for complete search history.

(56) References Cited

U.S. PATENT DOCUMENTS

| | | | | |
|---|---|---|---|---|
| 5,757,127 | A | 5/1998 | Inoguchi et al. | |
| 7,463,399 | B2 | 12/2008 | Shin et al. | |
| 2012/0081775 | A1* | 4/2012 | Ersman .................. | G02F 1/155 359/270 |
| 2012/0147448 | A1* | 6/2012 | Yaniv ...................... | G02F 1/155 29/846 |

(Continued)

FOREIGN PATENT DOCUMENTS

| | | | |
|---|---|---|---|
| CN | 105929617 | A | 9/2016 |
| CN | 106057856 | A | 10/2016 |

(Continued)

OTHER PUBLICATIONS

Office Action issue by (TIPO) Taiwan Intellectual Property Office Ministry of Economic Affairs R.O.C., Jun. 7, 2024, for Application No. 112137547 Tawian.

(Continued)

*Primary Examiner* — James A Dudek
(74) *Attorney, Agent, or Firm* — Tim Tingkang Xia, Esq.; Troutman Pepper Locke LLP

(57) ABSTRACT

An electronic device includes a first substrate, a second substrate disposed opposite to the first substrate, and an electrochromic layer disposed between the first base and the second base. The first substrate includes a first base, a trace, a dielectric layer and an electrode. The dielectric layer is disposed on the first base and covers the trace. The electrode is disposed on the dielectric layer, and is electrically connected to the trace through a contact window of the dielectric layer. The trace includes a first mesh conductive pattern. The first mesh conductive pattern of the trace partially overlaps with the electrode.

13 Claims, 7 Drawing Sheets

(56) References Cited

U.S. PATENT DOCUMENTS

2013/0127374 A1 5/2013 Lin et al.

FOREIGN PATENT DOCUMENTS

| | | | |
|---|---|---|---|
| CN | 209657051 | U | 11/2019 |
| CN | 114089573 | A | 2/2022 |
| CN | 114420704 | A | 4/2022 |
| JP | S61167926 | A | 7/1986 |

OTHER PUBLICATIONS

Office Action issued by the China National Intellectual Property Administration for Application No. 202410232777.4, China, Apr. 30, 2026.

* cited by examiner

ELECTRONIC DEVICE

CROSS-REFERENCE TO RELATED PATENT APPLICATION

This non-provisional application claims priority to and the benefit of, pursuant to 35 U.S.C. § 119(a), patent application No. 112137547 filed in Taiwan on Sep. 28, 2023. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to an electronic device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transparent display panel refers to a display device which may provide a transparent display state for a user to view the scene behind it. The transparent display panel has a display region and a transparent region. The display region may provide a display image for the user's view, and the transparent region is in the transparent state for the user to view the scene behind it. The display region is disposed with pixels for emitting image light beams toward a display surface of the transparent display panel, thereby providing the image. Under the influence of the ambient light, the transparent display panel generally has low contrast. To increase the contrast of the transparent display panel, a dimming panel may be disposed behind the transparent display panel. The dimming panel may be switched to a shading mode to block the ambient light, thereby increasing the contrast.

The dimming panel includes a first substrate, a second substrate disposed opposite to the first substrate and an electrochromic layer disposed between the first substrate and the second substrate. By controlling a voltage difference between the electrode of the first substrate and the electrode of the second substrate, the electrochromic layer may change from the transparent state to the light absorbing state, such that the dimming panel is switched to the shading mode. However, when the electrochromic layer changes from the transparent state to the light absorbing state, its resistance also decreases. At this time, if the resistances of the electrode of the first substrate/the electrode of the second substrate are too high, the driving current may tend to flow through the portion of the electrochromic layer that has already changed to the light absorbing state, without easily flowing through the other portion of the electrochromic layer that has not yet changed to the light absorbing state, thus resulting in the dimming panel not being able to turn uniformly black across the entire area. In addition, the driving signals of the dimming panel are required to be transmitted to the electrodes of the first substrate/the electrode of the second substrate by the traces. However, each trace is disposed between two adjacent electrode columns, such that the dimming panel has an opaque trace region, thus affecting the visual effect thereof.

SUMMARY

The present disclosure provides an electronic device having good characteristics.

The electronic device according to certain embodiments of the present disclosure includes a first substrate, a second substrate disposed opposite to the first substrate, and an electrochromic layer disposed between the first base and the second base. The first substrate includes a first base, at least one trace, a dielectric layer and at least one electrode. The at least one trace is disposed on the first base. The dielectric layer is disposed on the first base, and covers the at least one trace. The dielectric layer has at least one contact window. The at least one electrode is disposed on the dielectric layer and is electrically connected to the at least one trace through the at least one contact window of the dielectric layer. The at least one trace includes a first mesh conductive pattern. The first mesh conductive pattern has a plurality of first mesh lines and a plurality of first meshes defined by the first mesh lines, and the first mesh conductive pattern of the at least one trace partially overlaps with the at least one electrode.

These and other aspects of the present disclosure will become apparent from the following description of the embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
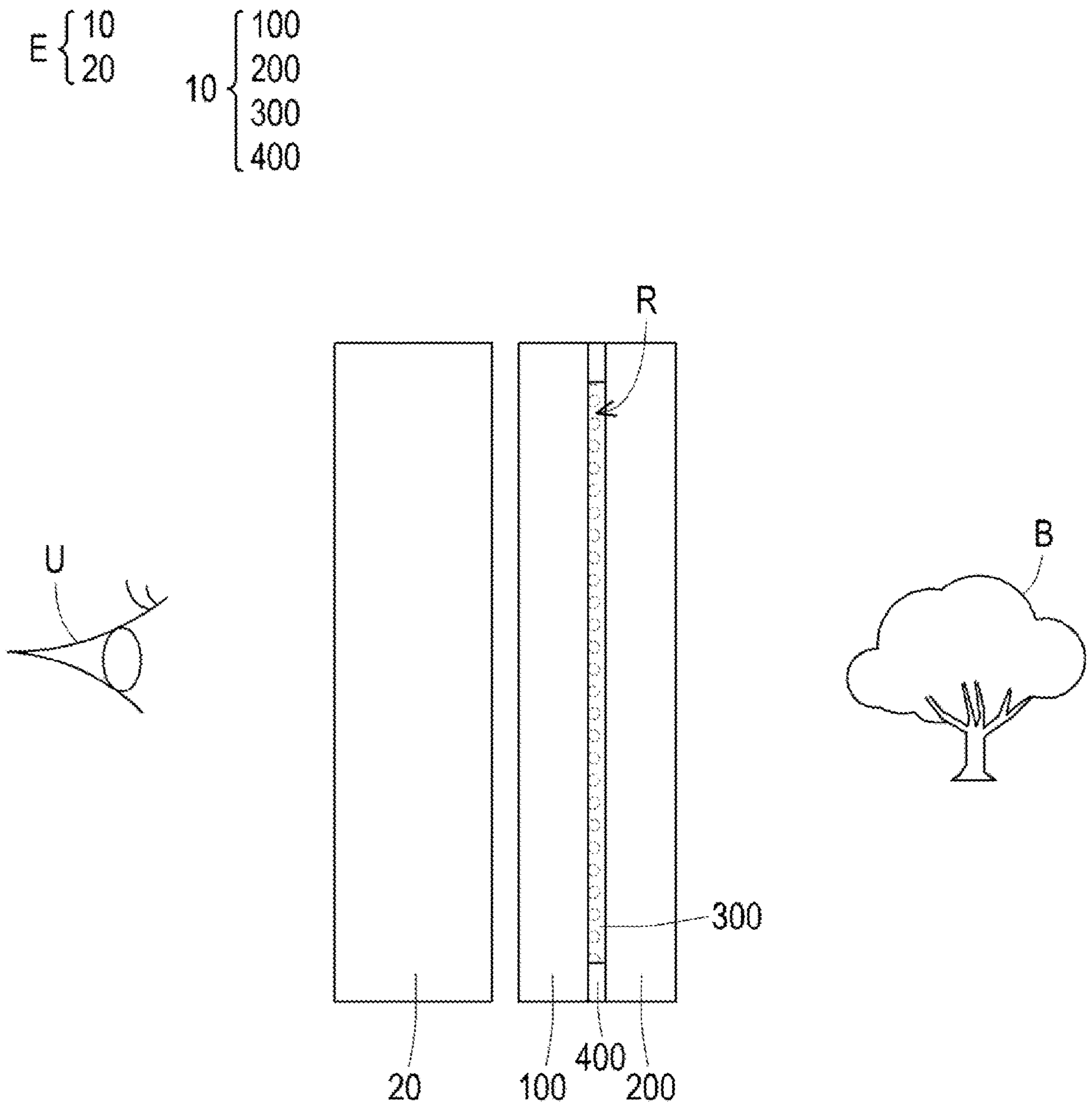
FIG. 1 is a sectional schematic view of an electronic device according to one embodiment of the present disclosure.

The present disclosure will now be described hereinafter in details with reference to the accompanying drawings, in which exemplary embodiments of the disclosure are shown. Whenever possible, identical reference numerals refer to identical or like elements in the drawings and descriptions.

It should be understood that when one component such as a layer, a film, a region or a substrate is referred to as being disposed "on" the other component or "connected to" the other component, the component may be directly disposed on the other component or connected to the other component, or an intermediate component may also exist between the two components. In contrast, when one component is referred to as being "directly disposed on the other component" or "directly connected to" the other component, no intermediate component exists therebetween. As used herein, a "connection" may be a physical and/or electrical connection. In addition, when two components are "electrically connected" or "coupled", other components may exist between the two components.

The terms "about", "approximately" or "substantially" as used herein shall cover the values described, and cover an average value of an acceptable deviation range of the specific values ascertained by one of ordinary skill in the art, where the deviation range may be determined by the measurement described and specific quantities of errors related to the measurement (that is, the limitations of the measuring system). For example, the term "about" represents within one or more standard deviations of a given value of range, such as within ±30 percent, within ±20 percent, within ±10 percent or within ±5 percent. Moreover, the terms "about", "approximately" or "substantially" as used herein may selectively refer to a more acceptable deviation range or the standard deviation based on the optical characteristics, the etching characteristic or other characteristics, without applying one standard deviation to all characteristics.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a sectional schematic view of an electronic device according to one embodiment of the present disclosure. Referring to FIG. 1, the electronic device E includes a transparent display panel 20 and a dimming panel 10 disposed behind the transparent display panel 20. The dimming panel 10 may be switched among a transparent mode, a shading mode and a partial-transparent partial-shading mode. When the dimming panel 10 is switched to the transparent mode, a user U may view the display image of the transparent display panel 20, and may simultaneously view the background B behind the transparent display panel 20. When the dimming panel 10 is switched to the shading mode, the user U may more clearly view the display image with higher contrast, but cannot view the background B at the rear. When the dimming panel 10 is switched to the partial-transparent partial-shading mode, a dimming region of the dimming panel 10 includes a first light control region (not labeled) and a second light control region (not labeled), where the first light control region is transparent, and the second light control region shades light. A display region (not labeled) of the transparent display panel 20 includes a first display region (not labeled) and a second display region (not labeled) respectively overlapping with the first light control region and the second light control region. The electronic device E may provide transparent display effect at the location of the first display region, and may provide an opaque display image with higher contrast.

The dimming panel 10 includes a first substrate 100, a second substrate 200, an electrochromic layer 300 and a frame adhesive 400. The frame adhesive 400 is connected to the first substrate 100 and the second substrate 200 and collectively defines a receiving space R with the first substrate 100 and the second substrate 200, and the electrochromic layer 300 is encapsulated in the receiving space R. By controlling the voltage of the electrode (not illustrated) of at least one of the first substrate 100 and the second substrate 200, the dimming panel 10 may be switched to the transparent mode, the shading mode or the partial-transparent partial-shading mode. The structure and the operating method of the dimming panel 10 are hereinafter described with respect to other exemplary drawings as follows.

Figure 2:
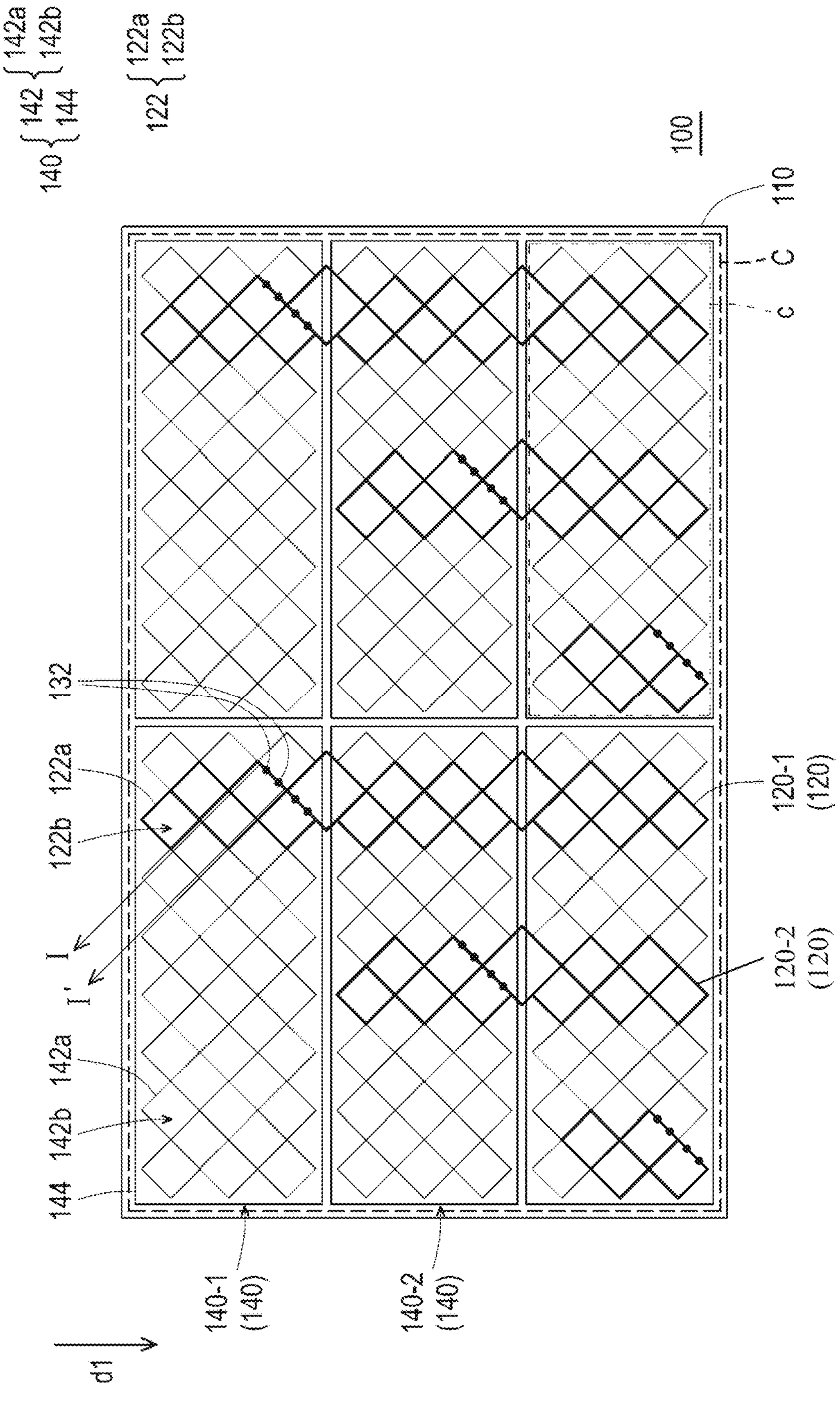
FIG. 2 is a top schematic view of a first substrate of the dimming panel according to one embodiment of the present disclosure.
Figure 3:
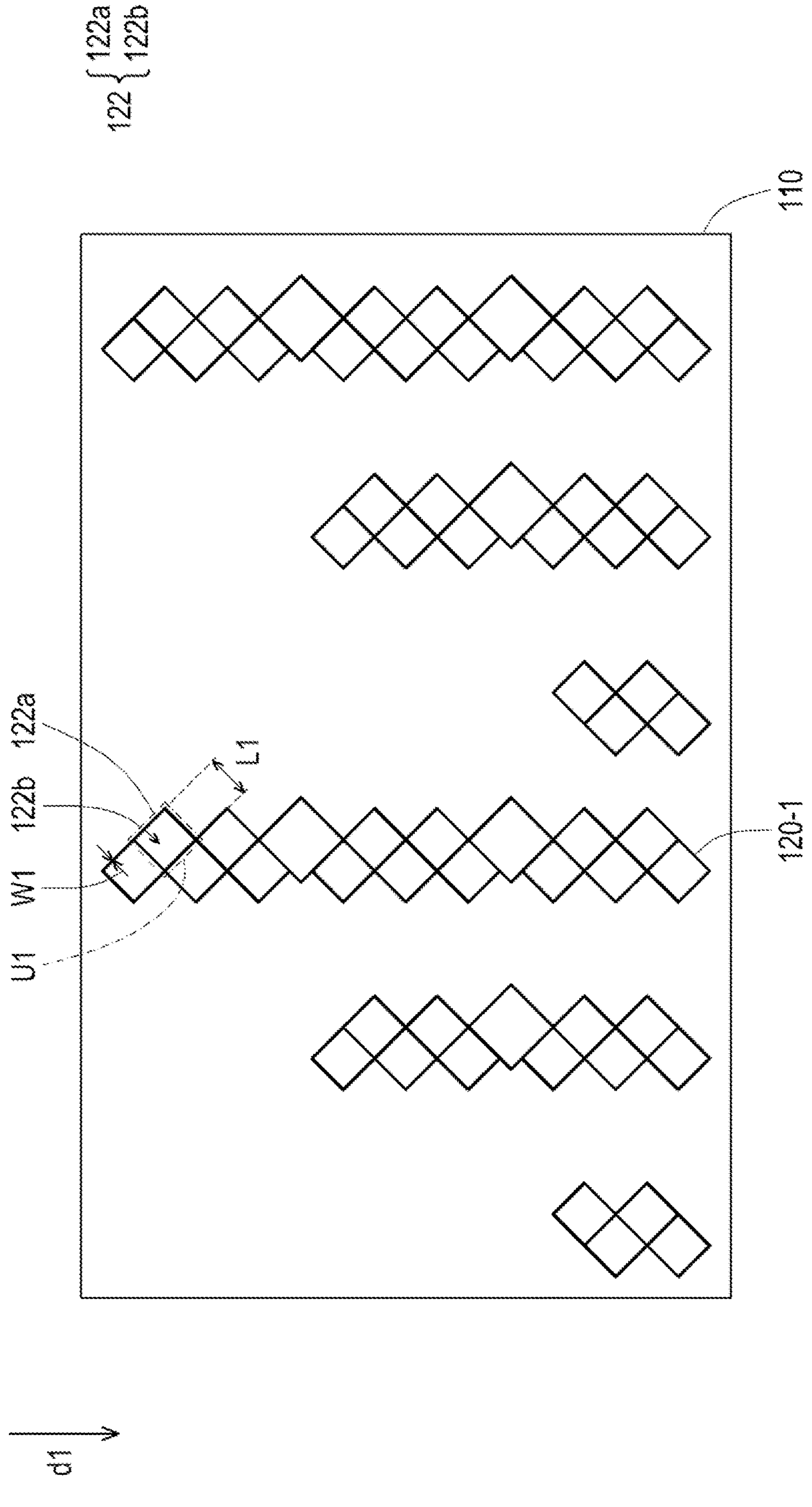
FIG. 3 is a top schematic view of a first base and traces of the first substrate of the dimming panel according to one embodiment of the present disclosure.
Figure 4:
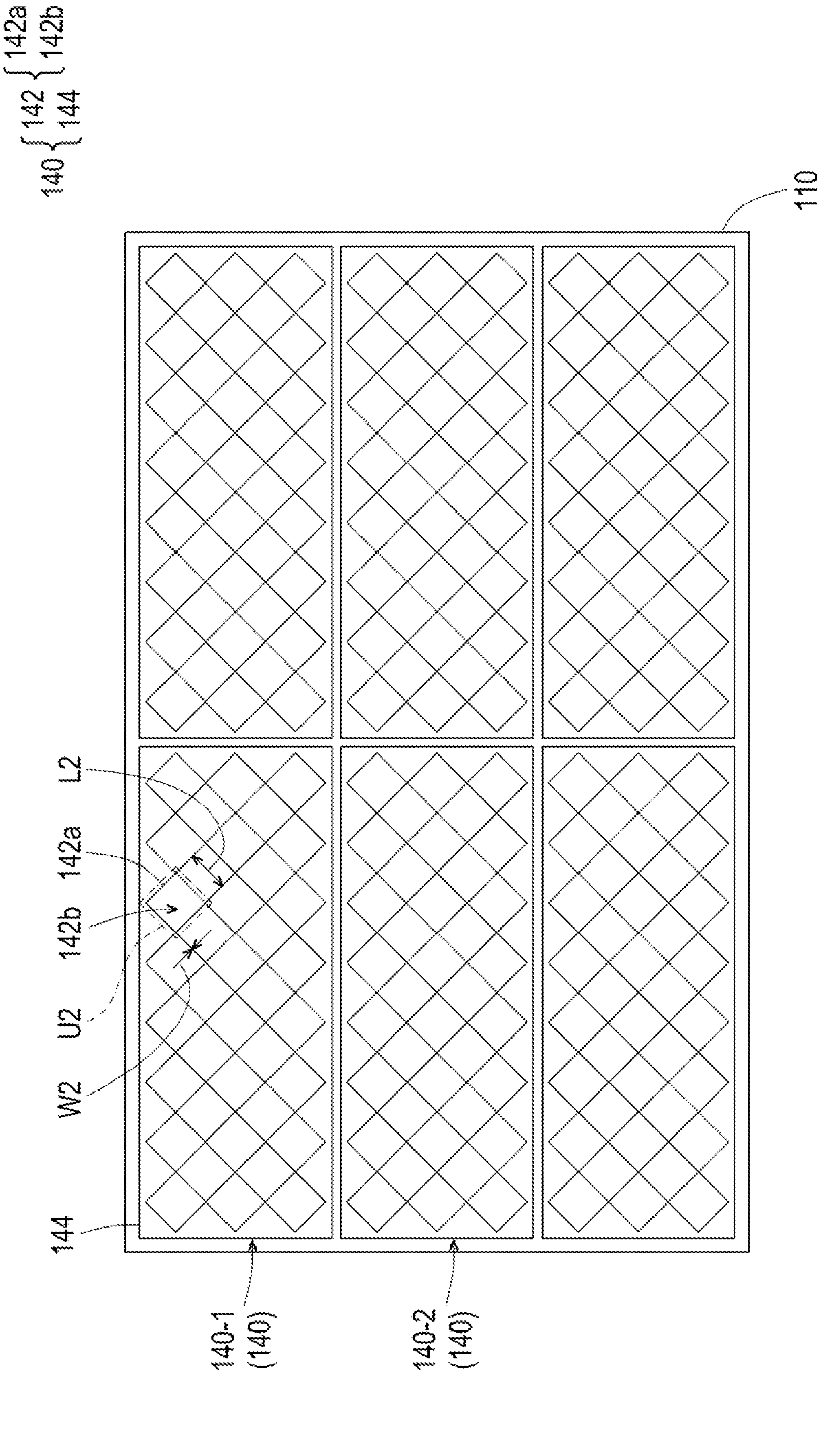
FIG. 4 is a top schematic view of a first base and electrodes of the first substrate of the dimming panel according to one embodiment of the present disclosure.
Figure 5:
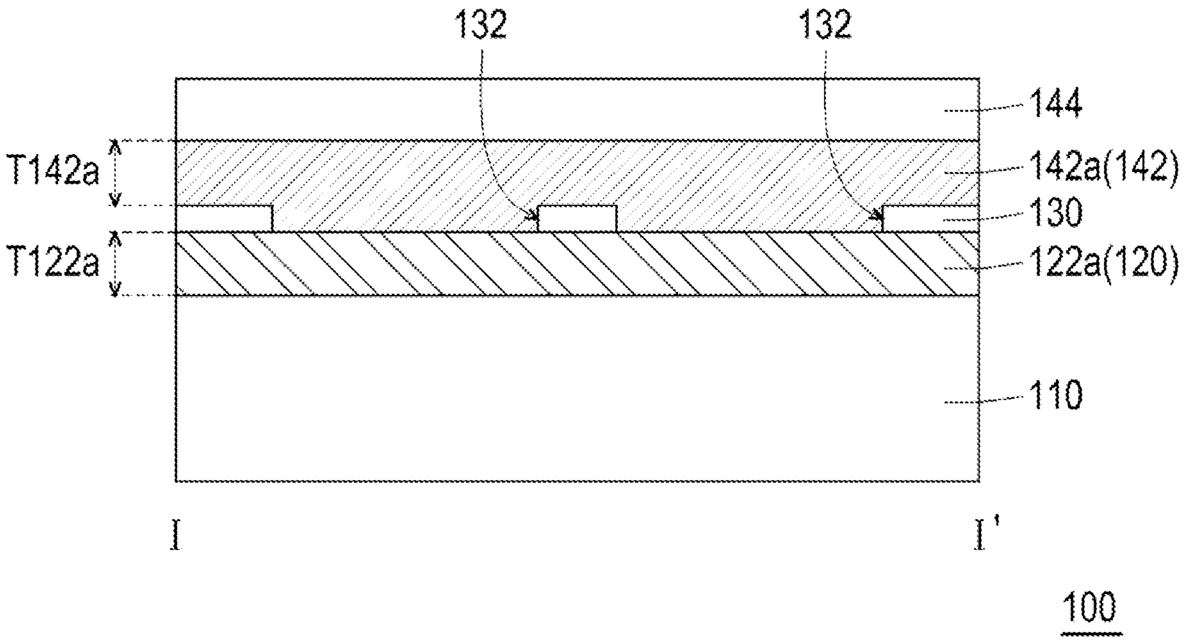
FIG. 5 is a sectional schematic view of the first substrate of the dimming panel according to one embodiment of the present disclosure.

FIG. 2 is a top schematic view of a first substrate of the dimming panel according to one embodiment of the present disclosure. FIG. 3 is a top schematic view of a first base and traces of the first substrate of the dimming panel according to one embodiment of the present disclosure. FIG. 4 is a top schematic view of a first base and electrodes of the first substrate of the dimming panel according to one embodiment of the present disclosure. FIG. 5 is a sectional schematic view of the first substrate of the dimming panel according to one embodiment of the present disclosure. FIG. 5 corresponds to the sectional line I-I' of FIG. 2.

Referring to FIG. 2, FIG. 3 and FIG. 5, the first substrate 100 includes a first base 110 and at least one trace 120 disposed on the first base 110. Each trace 120 includes a first mesh conductive pattern 122, and the first mesh conductive pattern 122 has a plurality of first mesh lines **122*a* and a plurality of first meshes 122*b* defined by the first mesh lines 122*a***.

Referring to FIG. 2 and FIG. 3, in one embodiment, the first substrate 100 may optionally include a plurality of traces 120 structurally separated from each other, but the present disclosure is not limited thereto. In one embodiment, the material of the first mesh conductive pattern 122 is, for example, a metal, but the present disclosure is not limited thereto. In one embodiment, the first mesh conductive pattern 122 of each trace 120 may include a plurality of repeated structures U1 connected to each other. For example, in one embodiment, the repeated structures U1 may be rhombic-shaped, but the present disclosure is not limited thereto, and in other embodiments, the repeated structures U1 may be circular-shaped, polygonal-shaped or in other shapes.

In one embodiment, the repeated structures U1 are arranged at a pitch L1, each first mesh line **122*a* of the first mesh conductive pattern 122 has a line width W1, and L1/W1<87.5. But the present disclosure is not limited thereto, and in other embodiments, it may be L1/W1>87.5, and when L1/W1>87.5, a thickness T122*a* of each first mesh line 122*a*** is preferably greater than 6000 angstroms (Å).

Referring to FIG. 2, FIG. 3 and FIG. 5, the first substrate 100 further includes a dielectric layer 130, disposed on the first base 110, covering the at least one trace 120, and having at least one contact window 132 overlapping with the at least one trace 120. In one embodiment, the dielectric layer 130 covers a plurality of traces 120 and has a plurality of contact windows 132, and each trace 120 overlaps with at least one contact window 132. In one embodiment, the material of the dielectric layer 130 may be an inorganic material (such as silicon oxide, silicon nitride, silicon oxynitride, or a stacked layer of at least two materials thereof), an organic material or a combination thereof.

Referring to FIG. 2, FIG. 3, FIG. 4 and FIG. 5, the first substrate 100 further includes at least one electrode 140, disposed on the dielectric layer 130, and electrically connected to the at least one trace 120 through the at least one contact window 132 of the dielectric layer 130. In one embodiment, the first substrate 100 includes a plurality of electrodes 140 structurally separated from each other, and each electrode 140 is electrically connected to a corresponding trace 120 through the at least one contact window 132 of the dielectric layer 130.

In one embodiment, each electrode 140 may include a transparent conductive pattern 144, and the transparent conductive pattern 144 partially overlaps with the first mesh conductive pattern 122 of a corresponding trace 120. In one embodiment, the material of the transparent conductive pattern 144 may include metal oxides (such as indium tin oxide, indium zinc oxide, aluminum tin oxide, aluminum zinc oxide, indium germanium zinc oxide, other suitable oxides, or a stacked layer of at least two thereof), polyethylene dioxythiophene (PEDOT), nanosilver, carbon nanotubes or any other conductive material with the surface resistance Rs less than 150Ω/□.

Referring to FIG. 2, FIG. 3, FIG. 4 and FIG. 5, in one embodiment, each electrode 140 further includes a second mesh conductive pattern 142. The second mesh conductive pattern 142 has a plurality of second mesh lines 142*a* and a plurality of second meshes 142*b* defined by the second mesh lines 142*a*, and the transparent conductive pattern 144 covers and is electrically connected to the second mesh conductive pattern 142. In one embodiment, the transparent conductive pattern 144 may directly cover the second mesh lines 142*a* of the second mesh conductive pattern 142 in order to be electrically contacted to the second mesh conductive pattern 142.

Referring to FIG. 1, FIG. 2 and FIG. 5, in one embodiment, the transparent conductive pattern 144 of each electrode 140 is located between the electrochromic layer 300 and the second mesh conductive pattern 142 of each electrode 140, the dielectric layer 130 is located between the second mesh conductive pattern 142 of each electrode 140 and the traces 120, and each trace 120 is located between the dielectric layer 130 and the first base 110. In one embodiment, the material of the second mesh conductive pattern 142 is, for example, a metal, but the present disclosure is not limited thereto.

Referring to FIG. 2 and FIG. 4, in one embodiment, the second mesh conductive pattern 142 of each electrode 140 may include a plurality of repeated structures U2 connected to each other. For example, in one embodiment, the repeated structures U2 may be rhombic-shaped, but the present disclosure is not limited thereto, and in other embodiments, the repeated structures U2 may be circular-shaped, polygonal-shaped or in other shapes.

In one embodiment, the repeated structures U2 are arranged at a pitch L2, each second mesh line 142*a* of the second mesh conductive pattern 142 has a line width W2, and $L2/W2<87.5$. But the present disclosure is not limited thereto, and in other embodiments, it may be $L2/W2>87.5$, and when $L2/W2>87.5$, a thickness T142*a* of each second mesh line 142*a* is preferably greater than 6000 angstroms (Å).

Referring to FIG. 2, FIG. 3 and FIG. 4, the first mesh conductive pattern 122 of each trace 120 partially overlaps with a corresponding electrode 140. In one embodiment, a portion of the second mesh lines 142*a* and a portion of the second meshes 142*b* of the second mesh conductive pattern 142 of each electrode 140 and a portion of the first mesh lines 122*a* and a portion of the first meshes 122*b* of the first mesh conductive pattern 122 of a corresponding trace 120 substantially coincide.

In one embodiment, the traces 120 include a first trace 120-1 and a second trace 120-2 substantially extending in a first direction d1, and the electrodes 140 include a first electrode 140-1 and a second electrode 140-2 arranged in the first direction d1. The first mesh conductive pattern 122 of the first trace 120-1 partially overlaps with the first electrode 140-1 and the second electrode 140-2. The first mesh conductive pattern 122 of the second trace 120-2 partially overlaps with the second electrode 140-2 and does not overlap with the first electrode 140-1. Each of the first electrode 140-1 and the second electrode 140-2 is electrically connected to a corresponding one of the first trace 120-1 and the second trace 120-2 through the corresponding contact windows 132. Specifically, the first electrode 140-1 is electrically connected to the first trace 120-1 through the corresponding contact windows 132, and the second electrode 140-2 is electrically connected to the second trace 120-2 through the corresponding contact windows 132. In other words, there is no electrical connection between the first electrode 140-1 and the second trace 120-2, and there is no electrical connection between the second electrode 140-2 and the first trace 120-1. In one embodiment, a portion of the first mesh lines 122*a* and a portion of the first meshes 122*b* of the first mesh conductive pattern 122 of the first trace 120-1, a portion of the second mesh lines 142*a* and a portion of the second meshes 142*b* of the second mesh conductive pattern 142 of the first electrode 140-1 and a portion of the second mesh lines 142*a* and a portion of the second meshes 142*b* of the second mesh conductive pattern 142 of the second electrode 140-2 substantially coincide.

Referring to FIG. 1 and FIG. 2, the first substrate 100 and the second substrate 200 may be assembled to each other, thereby forming the dimming panel 10. In one embodiment, after the first substrate 100 and the second substrate 200 are assembled to each other, the electrodes 140 of the first substrate 100 may respectively overlap with at least one electrode (not illustrated) of the second substrate 200. Each electrode 140 of the first substrate 100 and one electrode or a portion of a full-surface electrode of the second substrate 200 form an electrode assembly. The electrode assemblies respectively occupy a plurality of light control regions c of the dimming panel 10. The light control regions c form a dimming region C of the dimming panel 10. By controlling a voltage difference of each electrode assembly, the portion of the electrochromic layer 300 in each light control region c may be controlled to be transparent or to shade light, such that the light control region c may be in a transparent state or a shading state. If all of the light control regions c of the dimming panel 100 are in the transparent state, the electronic device E is in the transparent mode. If all of the light control regions c of the dimming panel 100 are in the shading state, the electronic device E is in the shading mode. If some of the light control regions c of the dimming panel 100 are in the shading state, and some other light control regions c are in the transparent state, the electronic device E is in the partial-transparent partial-shading mode. In the embodiment of FIG. 2, 6 light control regions c are provided as an example. However, the present disclosure is not limited thereto, and the quantity and the arrangement of the light control regions c may have other designs based on actual needs.

It should be noted that each trace 120 includes the first mesh conductive pattern 122, and the first mesh conductive pattern 122 of each trace 120 partially overlaps with the corresponding electrode 140. Thus, there is no need to provide an opaque trace region between a plurality of columns of the electrodes 140, thereby optimizing the visual effect. In addition, in one embodiment, the dimming panel 10 includes the electrodes 140 disposed in the light control regions c. The light control regions c, which may be in the transparent state or the light absorbing state, are respectively controlled by the electrodes 140 instead of being controlled by a same full-surface electrode in a large block, and/or each electrode 140 is formed by the second mesh conductive pattern 142 and the transparent conductive pattern 144 and has a low resistance. Thus, in the process of switching each light control region c of the dimming panel 10 from the shading state to the transparent state, the light control regions c are less likely to have the issue of being unable to turn uniformly black due to the resistance of the electrochromic layer 300 becoming lower than the corresponding resistances of the electrodes 140.

It should be noted herein that the following embodiment uses the reference numerals and certain contents of the aforementioned embodiment, in which identical or similar components are identified by identical reference numerals, and descriptions of the identical technical contents will be omitted. The omitted descriptions may be referenced to in the aforementioned embodiment, and are not hereinafter reiterated in the following embodiments.

Figure 6:
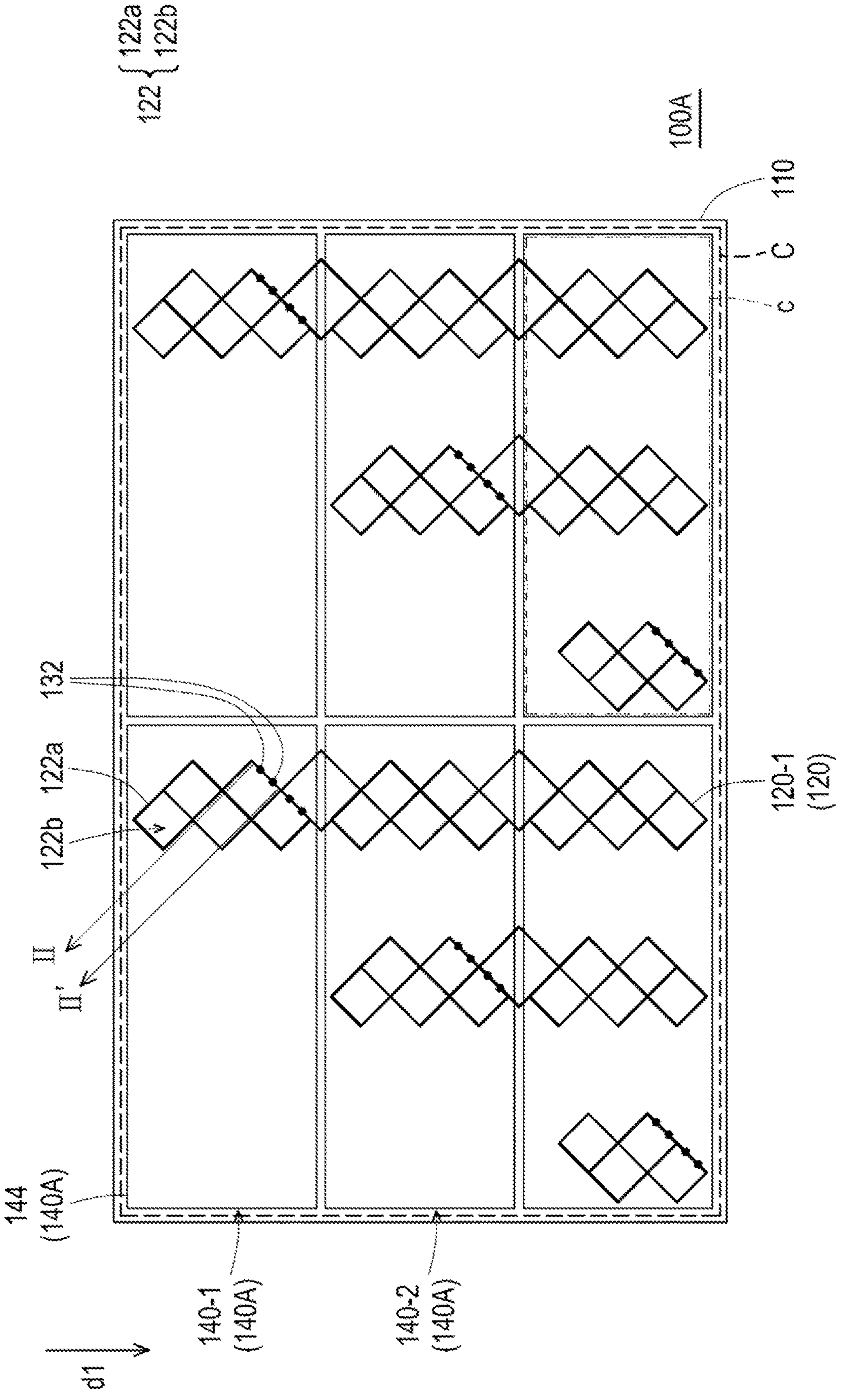
FIG. 6 is a top schematic view of a first substrate of a dimming panel according to another embodiment of the present disclosure.
Figure 7:
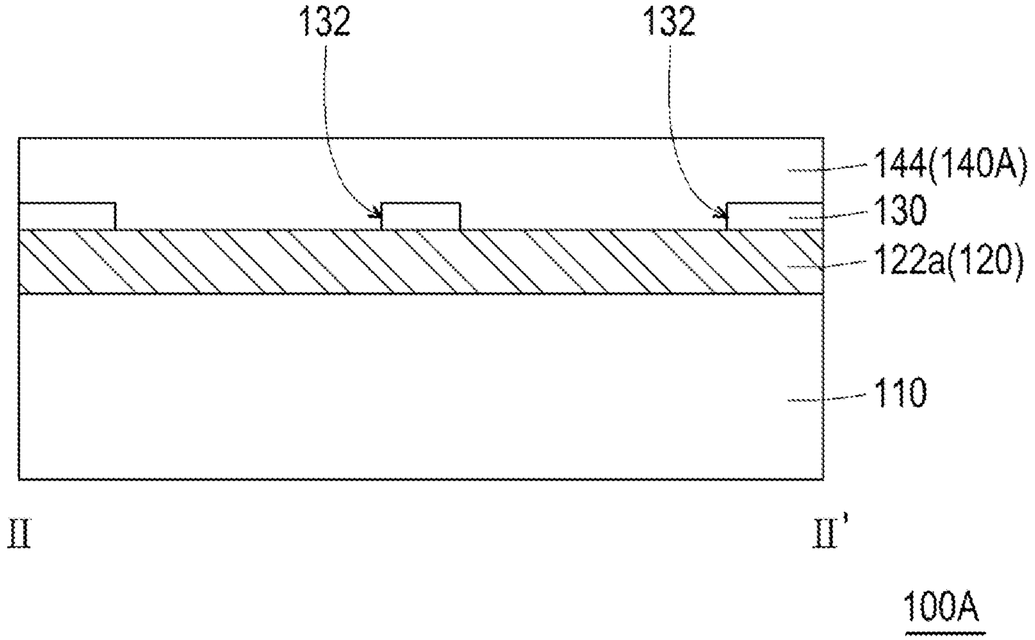
FIG. 7 is a sectional schematic view of the first substrate of the dimming panel according to another embodiment of the present disclosure.

FIG. 6 is a top schematic view of a first substrate of a dimming panel according to another embodiment of the present disclosure. FIG. 7 is a sectional schematic view of the first substrate of the dimming panel according to another embodiment of the present disclosure. FIG. 7 corresponds to the sectional line II-II' of FIG. 6.

Referring to FIG. 6 and FIG. 7, the first substrate 100A in the present embodiment is similar to the first substrate 100 in the previous embodiment, and the difference between the two exists in that: the electrodes 140A of the first substrate 100A in the present embodiment is different from the electrodes 140 of the first substrate 100 in the previous embodiment. Specifically, in the present embodiment, each electrode 140A includes the transparent conductive pattern 144 and does not include the second mesh conductive pattern 142, and the transparent conductive pattern 144 of each electrode 140A may be filled into the contact window 132 of the dielectric layer 130 and be electrically connected to a corresponding trace 120. In the present embodiment, an area of the transparent conductive pattern 144 may preferably fall within 25 $cm^3$ to 100 $cm^3$, but the present disclosure is not limited thereto.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electronic device, comprising:
a first substrate, comprising:
a first base;
at least one trace, disposed on the first base;
a dielectric layer, disposed on the first base, and covering the at least one trace, wherein the dielectric layer has at least one contact window; and
at least one electrode, disposed on the dielectric layer, and electrically connected to the at least one trace through the at least one contact window of the dielectric layer;
a second substrate, disposed opposite to the first substrate; and
an electrochromic layer, disposed between the first base and the second base;
wherein the at least one trace comprises a first mesh conductive pattern, the first mesh conductive pattern has a plurality of first mesh lines and a plurality of first meshes defined by the first mesh lines, and the first mesh conductive pattern of the at least one trace partially overlaps with the at least one electrode.

2. The electronic device according to claim 1, wherein the first mesh conductive pattern comprises a plurality of repeated structures arranged at a pitch, the pitch is L1, a line width of one of the first mesh lines is W1, and L1/W1<87.5.

3. The electronic device according to claim 1, wherein the at least one electrode comprises a transparent conductive pattern, and the transparent conductive pattern partially overlaps with the first mesh conductive pattern of the at least one trace.

4. The electronic device according to claim 3, wherein the at least one electrode further comprises a second mesh conductive pattern, the second mesh conductive pattern has a plurality of second mesh lines and a plurality of second meshes defined by the second mesh lines, and the transparent conductive pattern covers and is electrically connected to the second mesh conductive pattern.

5. The electronic device according to claim 4, wherein the transparent conductive pattern directly covers the second mesh conductive pattern.

6. The electronic device according to claim 4, wherein a portion of the second mesh lines and a portion of the second meshes of the second mesh conductive pattern of the at least one electrode and a portion of the first mesh lines and a portion of the first meshes of the first mesh conductive pattern of the at least one trace substantially coincide.

7. The electronic device according to claim 4, wherein the second mesh conductive pattern comprises a plurality of repeated structures arranged at a pitch, the pitch is L2, a line width of one of the second mesh lines is W2, and L2/W2<87.5.

8. The electronic device according to claim 1, wherein the at least one trace comprises a first trace substantially extending in a first direction, the at least one electrode comprises a first electrode and a second electrode arranged in the first direction, and the first mesh conductive pattern of the first trace partially overlaps with the first electrode and the second electrode.

9. The electronic device according to claim 8, wherein each of the first electrode and the second electrode comprises a second mesh conductive pattern, and the second mesh conductive pattern has a plurality of second mesh lines and a plurality of second meshes defined by the second mesh lines; and a portion of the first mesh lines and a portion of the first meshes of the first mesh conductive pattern of the first trace, a portion of the second mesh lines and a portion of the second meshes of the second mesh conductive pattern of the first electrode and a portion of the second mesh lines and a portion of the second meshes of the second mesh conductive pattern of the second electrode substantially coincide.

10. The electronic device according to claim 8, wherein the at least one trace further comprises a second trace, and the first mesh conductive pattern of the second trace partially overlaps with the second electrode and does not overlap with the first electrode.

11. The electronic device according to claim 8, wherein the first mesh conductive pattern of the first trace is electrically connected to the first electrode and not electrically connected to the second electrode; and the at least one trace further comprises a second trace, and the first mesh conductive pattern of the second trace is electrically connected to the second electrode.

12. The electronic device according to claim 4, wherein a portion of the second mesh lines of the second mesh conductive pattern of the at least one electrode is electrically connected to a portion of the first mesh lines of the first mesh conductive pattern of the at least one trace.

13. The electronic device according to claim 4, wherein the transparent conductive pattern is located between the electrochromic layer and the second mesh conductive pattern.

* * * * *